United States Patent [19]

Presz, Jr. et al.

[11] Patent Number: 4,835,961
[45] Date of Patent: Jun. 6, 1989

[54] FLUID DYNAMIC PUMP

[75] Inventors: Walter M. Presz, Jr., Wilbraham, Mass.; Robert W. Paterson, Simsbury; Michael J. Werle, W. Hartford, both of Conn.

[73] Assignee: United Technologies Corporation, Hartford, Conn.

[21] Appl. No.: 857,908

[22] Filed: Apr. 30, 1986

[51] Int. Cl.$^4$ .............................................. F02K 3/04
[52] U.S. Cl. ...................................... 60/264; 417/167; 60/262; 181/220
[58] Field of Search ............... 60/262, 264; 181/213, 181/220; 417/196, 198, 167, 168

[56] References Cited

U.S. PATENT DOCUMENTS

| | | | |
|---|---|---|---|
| 3,635,308 | 1/1972 | Millman | 181/220 |
| 3,696,617 | 10/1972 | Ellis | 60/264 |
| 3,861,140 | 1/1975 | Krabacher | 181/220 |
| 4,117,671 | 10/1978 | Neal et al. | 60/264 |
| 4,240,252 | 12/1980 | Sargisson et al. | 181/220 |

OTHER PUBLICATIONS

*Fluid Flow;* Saberskv, Rolf H.; Acosta, Allan J.; Hauptmann, Edward G., 1971, p. 160.

Primary Examiner—Louis J. Casaregola
Assistant Examiner—Timothy S. Thorpe
Attorney, Agent, or Firm—Stephen E. Revis

[57] ABSTRACT

A fluid dynamic pump, such as an ejector, has a common wall which separates a primary high energy fluid flow passage and a secondary low-energy fluid flow passage. The common wall includes a plurality of adjoining lobes extending in the direction of flow to the outlets of the passages at the downstream end of the common wall. A lobe on one side of the wall forms a corresponding trough on the other side. The common wall therefore has a wave-like shape at its downstream end. Primary and secondary fluid flow from the trough outlets on their respective sides of the common wall and are mixed together rapidly in a mixing region downstream of the outlets. A diffuser is located at the downstream end of the mixing region and enhances the pumping ability of the ejector. Secondary fluid is thereby drawn or pumped into the mixing region as a result of this transfer of energy from the primary stream to the secondary stream. Viscous losses are low during the process.

12 Claims, 5 Drawing Sheets

FIG. 2
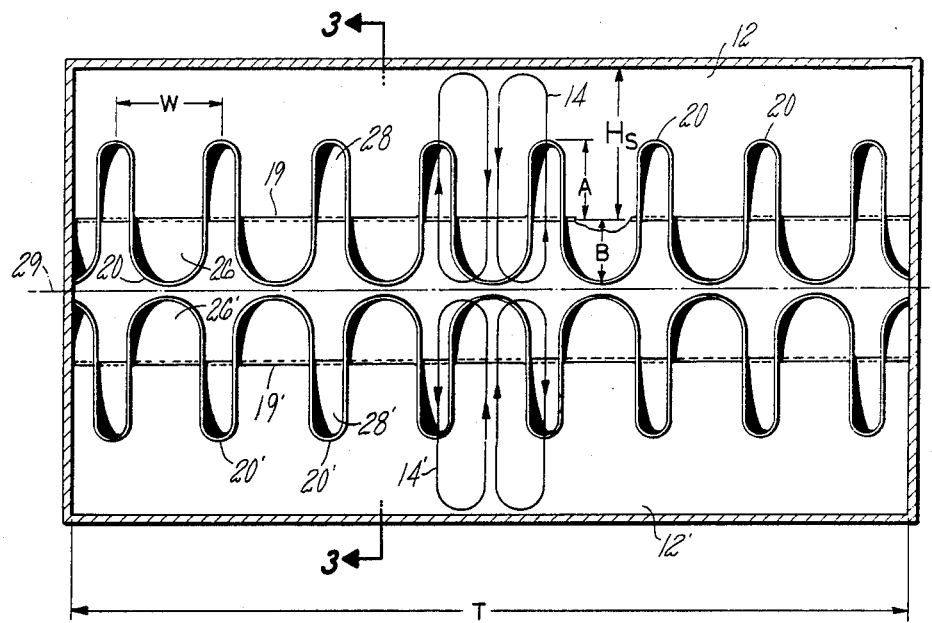
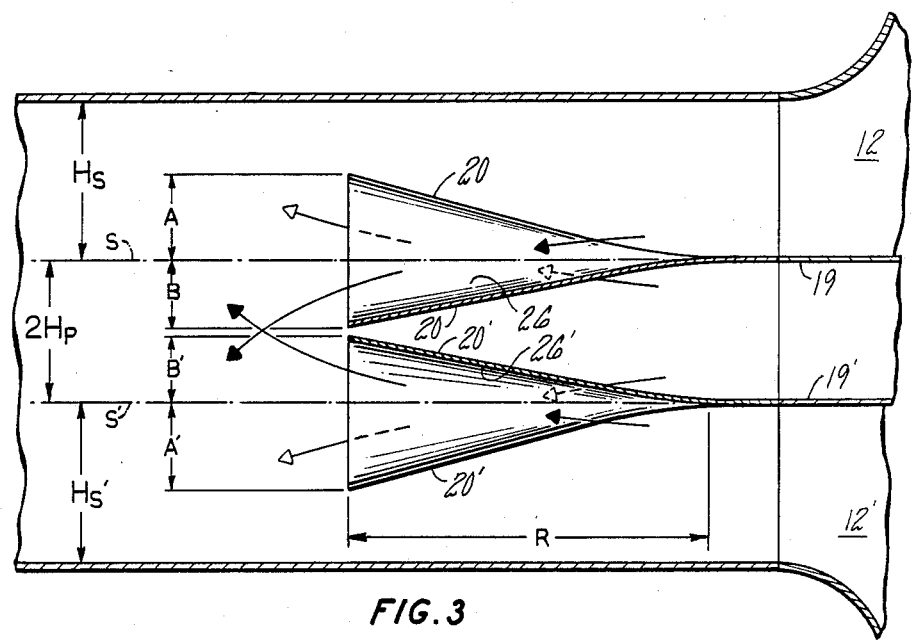
FIG. 3

FLUID DYNAMIC PUMP

DESCRIPTION

1. Technical Field

This invention relates to fluid dynamic pumps.

2. Background Art

Ejectors are well known in the art and are a type of fluid dynamic pump. Ejectors provide a means of pumping a low energy secondary fluid using the kinetic energy of a primary, higher energy fluid stream. The pumping is done with no moving parts. Ejectors have been used, for example, on aircraft engines to both increase thrust, and for mixing out high temperature exhaust flow with ambient air to provide lower jet noise and reduced thermal radiation from the rear of the engine.

The key mechanism for the operation of an ejector is fluid mixing. Energy is transferred from the high energy primary fluid stream to the low energy secondary fluid stream through viscous mixing. As used in this specification and appended claims, a "low-energy secondary fluid stream" of an ejector (fluid dynamic pump) means a stream (liquid or gas) within a flow passage having a total pressure no greater than the stagnation pressure resulting from the relative velocity between the flow passage walls and ambient fluid ingested by such passage.

In certain applications, such as on aircraft engines, where analytical predictions have indicated potentially high benefits from ejectors, the ability to implement them in an effective system application has been limited. One reason for this limitation has been the inability to sufficiently mix the primary and low-energy secondary fluid streams in a reasonable length and with acceptable losses.

One technique which has been found to greatly increase ejector mixing is to divide the primary stream into a plurality of adjacent individual, downstream extending, enclosed passages which direct individual streams from passage outlets alternately upwardly and downwardly. One ejector of this type is sometimes referred to as a "hypermixing nozzle" and is described more fully in A1AA Paper No. 73-654 *An Evaluation of Hypermixing for VSTOL Aircraft Augmentors*, A1AA 6th Fluid and Plasma Dynamics Conference (July 16-18, 1973). Other ejectors of this type are described in *Proceedings: Ejector Workshop for Aerospace Applications*, University of Dayton Research Inst., Dayton, Ohio, June, 1982 Air Force report #AFWAL-TR-82-3059. In these designs the individual streams mix more quickly with each other and somewhat enhance pumping efficiency; however, high total pressure losses are created which may be highly detrimental in certain applications, such as for thrust augmentation. It is highly desirable to improve the pumping efficiency of an ejector without incurring large mixing losses.

Ejectors for thrust augmentation are to be distinguished from lobe-type forced mixers, such as the type shown in U.S. Pat. No. 4,066,214, which are primarily used to mix high energy streams, such as a gas turbine engine fan bypass stream with the core engine stream for noise reduction. Although some thrust augmentation may occur in such cases due to energy transfer which results in a more uniform velocity and temperature profile across the mixing region, there is no mass flow increase through the exhaust nozzle, and thrust augmentation, therefore, is minimal at best. Ejectors used in gas turbine engines primarily for thrust augmentation draw ambient air into the exhaust gases, thereby adding mass to the exhausted gases and increasing thrust. These ejectors have only met with limited success.

DISCLOSURE OF INVENTION

One object of the present invention is a fluid dynamic pump or ejector which provides improved pumping efficiency and/or thrust augmentation.

Another object of the present invention is an ejector which provides improved mixing of fluids from two separate streams.

Another object of the present invention is an ejector which improves the operation of a diffuser located downstream thereof.

A further object of the present invention is an ejector having a shorter length.

According to the present invention, a fluid dynamic pump comprises a primary high energy fluid flow passage and a secondary low energy fluid flow passage which empty into a common mixing region at their outlets, wherein a common wall separates the primary and secondary flow passages from a point upstream of and to their outlets, the common wall including a plurality of adjoining lobes extending in the direction of flow through the passages to the outlets, alternate lobes penetrating, respectively, into the primary and secondary flow passages to define a wave-like downstream end of the common wall.

More specifically, the wall which forms a lobe which penetrates into, for example, the primary flow passage defines a corresponding trough in the secondary flow passage. Likewise, each lobe which penetrates into the secondary flow passage defines a corresponding trough in the primary flow passage. Thus, a trough in the primary flow passage has side walls common to the troughs on either side of it in the secondary flow passage, and vice versa. Adjacent streams of, alternately, primary and secondary fluid, flow from the trough outlets and mix together rapidly within the mixing region, the energy from the primary fluid being transferred rapidly to the secondary fluid, causing the secondary fluid to be drawn into the mixing chamber.

With this invention, not only is energy transferred from a high energy, primary stream to a low energy secondary stream by the simple fact that the two streams come into contact with each other, as is the case with ejectors of the prior art, but it appears that large scale axial vortices are created immediately downstream of the trough outlets, which enhance the mixing and energy transfer without creating large viscous losses. It is believed these large scale vortices stir the two streams together providing convective mixing rather than the shear mixing thought to be the mechanism of prior art flat plate ejectors. Such convective mixing is rapid and very low loss when compared to shear mixing. Whatever the mechanism, the result is improved ejector pumping and/or thrust augmentation with lower losses than with prior art ejectors, and a reduction in the mixing region length needed to achieve effective mixing.

It has been further discovered that a when diffuser is used in combination with (i.e., downstream of) the ejector of the present invention, surprisingly improved ejector performance is obtained with a short mixing region. One reason for this improvement is that a diffuser located at the outlet to the mixing region can have a greater than normal area ratio without the occurrence of separation from the diffuser wall. This is believed to result from the presence of the above mentioned large scale axial vortices in the mixing region. It is believed the vortices scrub the walls of the mixing region to eliminate the low momentum boundary layer normally formed along the walls. Even more importantly, it is theorized these vortices create a velocity distribution across the mixing duct more favorable to diffusion by displacing the low momentum secondary flow near the wall with higher momentum primary flow. Thus, the fluid along the walls of the mixing region is able to stay attached to the diffuser wall at greater diffusion angles and/or for greater distances than would otherwise be possible. The net effect of the diffuser is to enable the ejector to pump larger amounts of secondary fluid and/or provide greater thrust augmentation than has previously been possible using ejector/diffuser systems of the prior art.

The foregoing and other objects, features and advantages of the present invention will become more apparent in the light of the following detailed description of preferred embodiments thereof as illustrated in the accompanying drawing.

BRIEF DESCRIPTION OF DRAWING

FIG. 2 is a sectional view taken generally in the direction 2—2 of FIG. 1.

FIG. 3 is a sectional view taken along the line 3—3 of FIG. 2.

BEST MODE FOR CARRYING OUT THE INVENTION

Figure 1:
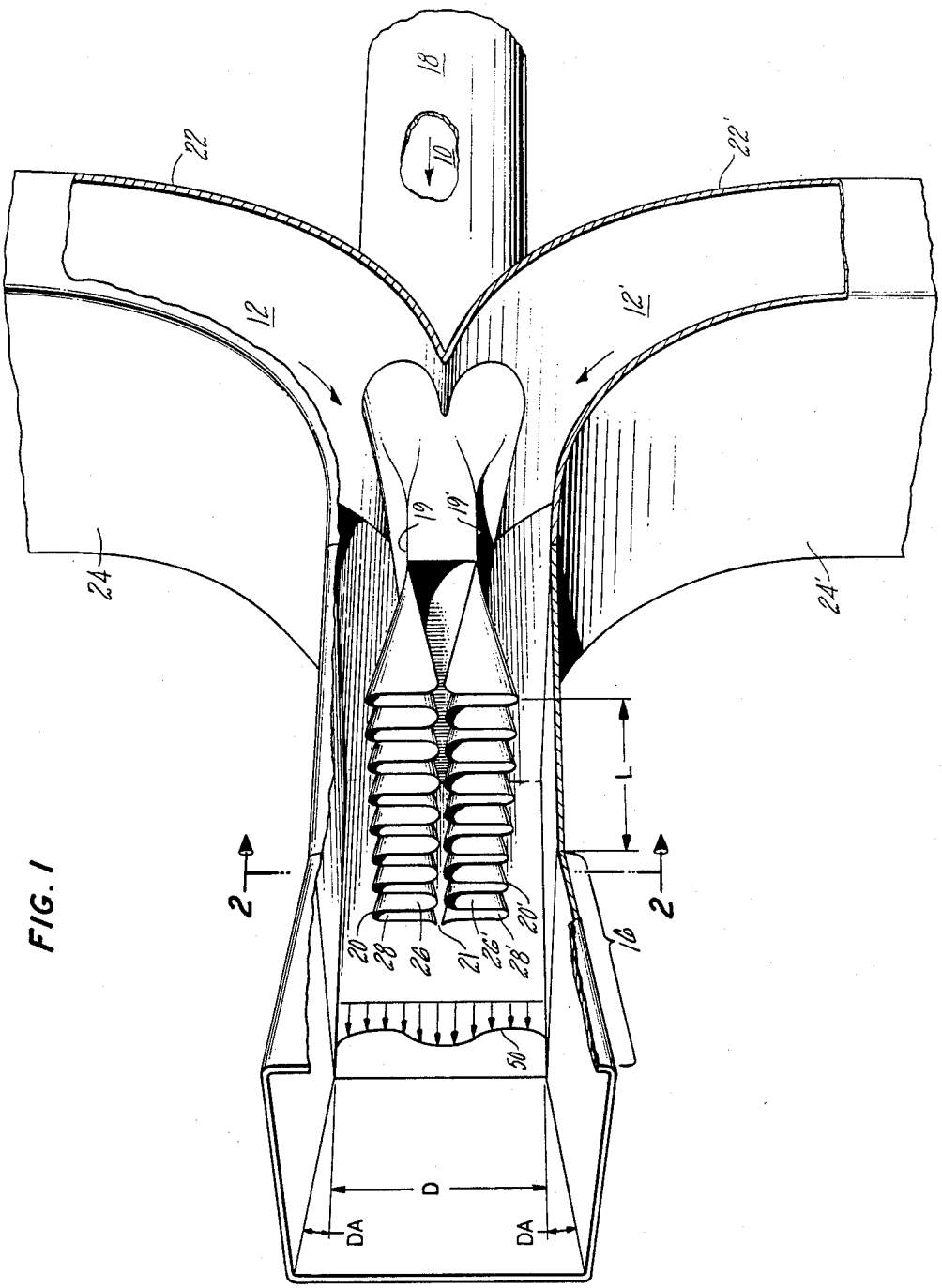
FIG. 1 is a simplified perspective view showing an ejector/diffuser system according to the present invention.

As an exemplary embodiment of the present invention, consider the fluid dynamic pump or ejector shown in combination with a diffuser in FIG. 1. Although in this embodiment the flow velocities are assumed to be subsonic throughout the system, the invention may also be used where supersonic velocities are encountered.

The system comprises a primary flow passage 10; a pair of separate secondary flow passages 12, 12'; a mixing region 14; and a diffusing section 16. The primary passage 10 is formed by a duct 18 which is cylindrical at its upstream end and which transitions to a rectangular cross section before it reaches its outlet end 2. The rectangular portion of the primary duct 18 comprises upper and lower duct walls 19, 19', respectively, each of which are formed into a plurality of downstream extending lobes 20, 20'. The secondary passages 12, 12' each comprise a pair of spaced apart inner and outer duct walls 22, 24, respectively, and 22', 24', respectively. The inner walls 22, 22' merge with primary duct walls 19, 19'. The wall 19 thereby becomes a common wall which separates the primary flow passage 10 from the secondary flow passage 12; and the duct wall 19' becomes a common wall which separates the primary passage 10 from the secondary passage 12'.

Figure 8:
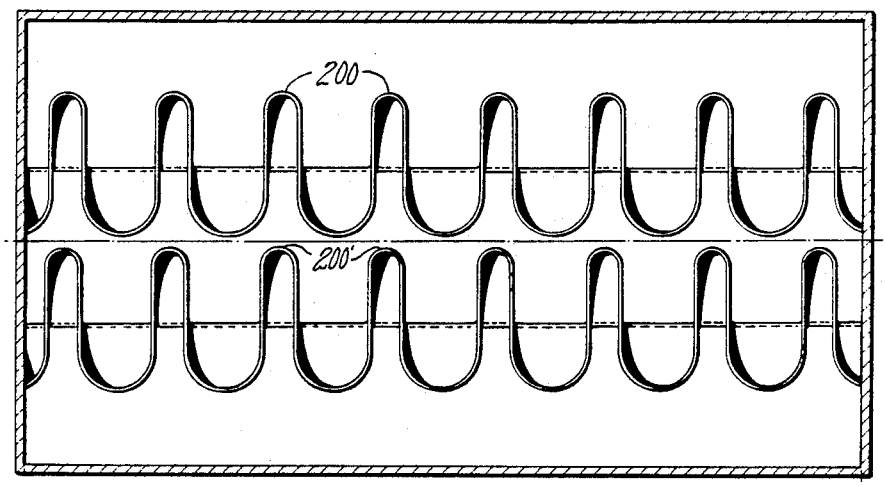
FIG. 8 is a schematic view of an alternate arrangement for the ejector lobes shown in FIG. 2.

With reference to FIG. 2, the lobes 20 alternately project into the secondary passage 12 and the primary passage 10. A lobe which projects into the primary passage creates a corresponding trough 26 in the secondary passage. Similarly, each lobe 20 which projects into the secondary passage 12 forms a corresponding trough 28 in the primary passage. The common wall 19' is similarly constructed to create a plurality of troughs 26', 28' in the secondary passage 12' and the primary passage 10, respectively. In this embodiment the lobes 20, 20' are mirror images of each other about a horizontal plane 29. This is herein referred to as a "reflective" lobe pattern. In the alternate embodiment of FIG. 8, lobes 200 which penetrate into the secondary passage 12 are aligned with the lobes 200' which penetrate into the primary passage 10. Such arrangement is herein called an "aligned" lobe pattern. The present invention also contemplates the use of other lobe patterns. Also, both sets of lobes and the lobes within a set do not have to be the same size or shape.

The development of the individual lobes 20, 20' is best shown in FIG. 3. The troughs 26, 26' created by the lobes 20, 20' blend smoothly at their upstream ends with their respective duct walls 19, 19'. The slope of the troughs (trough depth to length) is selected to be shallow enough to prevent streamwise two-dimensional boundary layer separation therefrom as the respective primary and secondary fluids flow therein. If the slope is measured using the direction of bulk flow immediately upstream of the troughs as a base line, a slope of no greater than about 30° is likely to be an upper limit. The cross-sectional area of the mixing region 14 perpendicular to the principle flow direction should be at least as large and preferably the same as the sum of the areas of the primary and secondary flow passages at their outlets. In the embodiment of FIG. 1 the mixing region is a constant cross-sectional flow area over its length L. Preferably the ratio L/D is between 0.5 and 3.0, and is most preferably between 1.0 and 2.0. As used herein, L is the length of the mixing region and D is the effective inlet height of the diffuser, which is the distance, transverse to the principle flow direction, between the opposed diverging walls at the diffuser inlet. (For a three-dimensional diffuser, the inlet height would be the minimum height, if height can be measured in more than one place. For a circular diffuser inlet the effective heights will be its inlet diameter. For an annular diffuser the effective inlet height will be the radial dimension of the annular gap). L/D ratios which are too large incur excessive wall friction losses; and ratios which are too small produce insufficient mixing. Optimization of L/D is dependent upon the specific ejector size and the configuration being used, and in unusual situations may even fall outside the preferred ranges stated above.

An important measure of the merits of an ejector is its pumping efficiency E. For example, for low subsonic Mach number and isothermal flow of identical primary and secondary fluids, E is herein defined as the ratio of mass flow rate of the secondary stream ($M_s$) to that of the primary stream ($M_p$). Although the phenomenon involved in the operation of the present invention is not fully understood, it is known that E is dependent upon lobe (or trough) size, shape and spacing. For purposes of setting forth preferred parameters which will aid in the selection of such size, shape and spacing, and referring to FIG. 2, let W be the distance between adjacent lobes within one of the flow passages at the downstream end thereof. W is hereinafter referred to as the lobe spacing. (For circumferentially spaced apart lobes W will be the average of the outermost peak-to-peak arc length and the innermost peak-to-peak arc length.) The maximum amount of penetration of a lobe into a secondary passage is designated by the reference letter A; and the maximum penetration of a lobe into the primary passage is designated by the reference letter B. The sum of A plus B is hereinafter referred to as the lobe amplitude. A and B are measured from an imaginary surface S which is an extension of the common duct wall immediately upstream of the lobes in the principal flow direction. $H_s$ is the height of the secondary passage immediately upstream of the lobes and $H_p$ is the height of the primary passage immediately upstream of the lobes. In a double row, two-dimensional ejector like that of FIG. 1, $H_p$ is half the distance between the surfaces S. In a single row, two-dimensional ejector like that shown schematically in FIGS. 4 and 5, $H_p$ is the entire height of the primary passage.

Based upon limited test results, known flow theory, and a hypothesis of the phenomenon involved herein, it is believed that best results may be obtained if certain parameter relationships are met. First, it is felt that significant lobe penetration into both the primary and secondary streams should occur. Lobe penetration into the primary stream may be represented by the ratio $B/H_p$. Lobe penetration into the secondary stream may be represented by the ratio $A/H_s$. While under certain circumstances $A/H_s$ and $B/H_p$ may be as large as 1.0, preferably such ratios should be within the range of about 0.5 to 0.85, most preferably about 0.6 to 0.8. With cylindrical passages the effective height H of a passage should be considered the radius of the passage at the outlet, and with annular passages the height is the radial dimension of the annulus at the outlet. In general, the lobes should penetrate at least half the height of each passage at the outlets, and preferably between 60% and 80% of the height.

Lobe spacing is also important. Too few lobes, spread too far apart, will give poor results. Too many lobes, crowded together, could result in troughs which are so narrow that viscous effects therewithin create excessive losses, and the desired vortices are not created downstream. In this regard it is believed good results may be obtained if the ratio $W/(A+B)$ is between about 0.25 and 4.0. A most preferred range is from 0.5 to 2.0.

It is also believed to be desirable to have as large a portion of the opposed sidewalls of each trough parallel to each other or closely parallel to each other at the trough outlets in the direction in which the effective height H of the passages is measured. This appears to help increase the mixing rate.

It should be kept in mind that maximum pumping efficiency may not always be a desired or necessary requirement. Other elements and objectives of the system in which the ejector is used, such as physical constraints, weight limits, the necessity to maintain a constant secondary or primary flow passage cross-sectional area (e.g. to prevent build up of back pressures) or the like may have to be taken into consideration.

Superimposed upon the ejector system of FIG. 1 is a velocity profile 50 which is representative of fluid velocities across the mixing region immediately upstream of the diffuser inlet. Note the relative uniformity of the velocity profile across the mixing region. In particular, note the high velocities near the walls. This velocity profile is believed to be typical for an ejector properly designed in accordance with the teachings of the present invention. The hereinabove referred to large scale vortices are depicted in FIG. 2 by the representative circulation patterns 14, 14'. It is the action of these vortices which create the high velocities near the walls.

Tests were run to compare an ejector system similar to that shown in FIGS. 1-3 with a prior art ejector system identical in all respects except the lobes 20, 20' were replaced by flat plates which were simply extensions of the duct walls 19, 19'. In this test W was 1.8 inches; $H_s$ and $H_{s'}$ were both 2.1 inches; $H_p$ was 1.15 inches; A and A' were both 1.3 inches; and B and B' were both 0.98 inch. Thus, lobe penetration into the primary stream, $B/H_p$, was 0.85; and lobe penetration into the secondary streams were $A/H_s = A/H_{s'} = 0.62$. The lobe spacing parameter, $W/A+B$, was 0.79. Lobe length R (FIG. 3) in the principle flow direction was 6.2 inches; and the mixing region width T (FIG. 2) was a constant 14 inches. Additionally, the mixing ducts had a constant rectangular cross-sectional area of 91 cubic inches and a length L (FIG. 1) which could be varied. The effective diffuser inlet height D was fixed at 6.5 inch. The diffuser area ratio for this test was a constant 1.34; and the diffuser half angle DA was 8.6. Finally, the shape and size of the troughs in the primary passage were selected to slightly converge the cross-sectional flow area of the primary passage toward its outlet to assist the troughs to run full by increasing the flow velocity therethru. This resulted in a slightly diverging secondary passage flow area. (Constant flow areas would also have been acceptable.)

Figure 9:
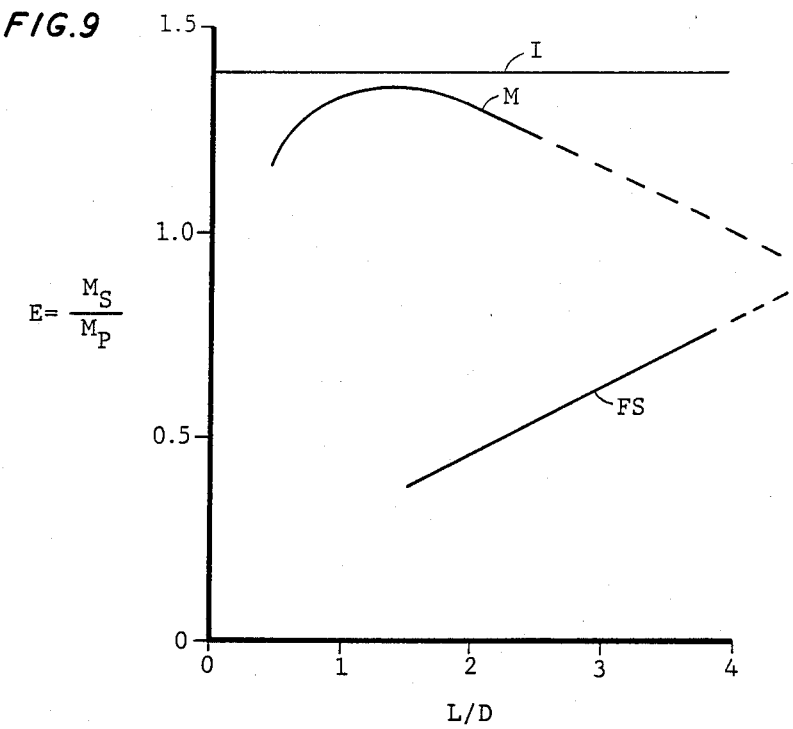
FIG. 9 is a graph comparing the pumping efficiency of an ejector/diffuser system according to the present invention to the pumping efficiency of a prior art ejector/diffuser system which uses a flat plate or free splitter configuration.
Figure 10:
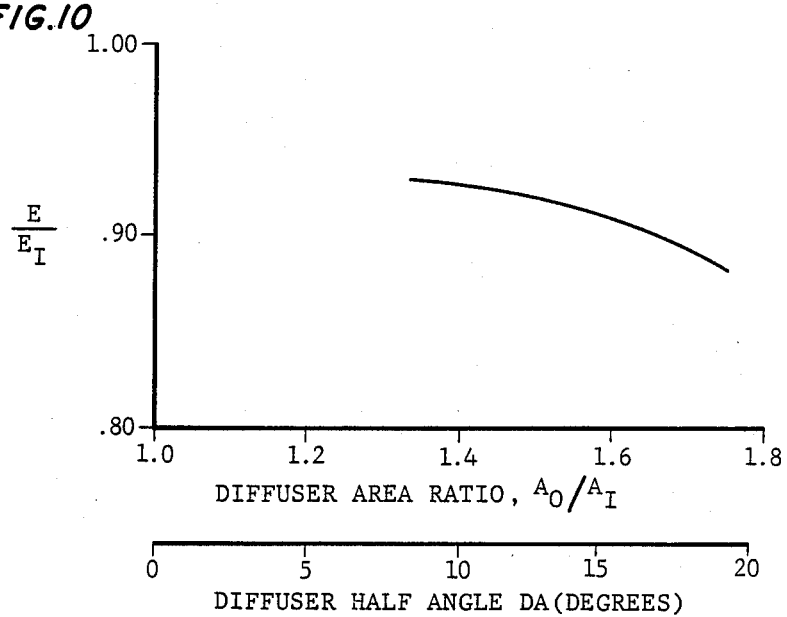
FIG. 10 is a graph showing the effect of varying diffusion angles on the pumping efficiency of an ejector/diffuser system according to the present invention.

FIG. 9 shows the average of the results of tests which were run at a primary to secondary stream total pressure ratio of between 1.01 and 1.08. Ejector efficiency E is plotted on the vertical axis for various ratios L/D (variable L, fixed D) plotted on the horizontal axis. The curve M is data for the ejector of the present invention, with the dotted portion being extrapolated. Curve FS is data for the free splitter ejector. The curve or line labeled I represents an ideal ejector which is assumed to achieve complete mixing, has no wall friction, has uniform primary and secondary flow profiles at the inlet to the mixing region and a uniform diffuser exit flow profile. Note the great difference in pumping efficiency between the free splitter and the present invention at the shorter mixing lengths L.

Additional tests were run on the same ejector configuration of the present invention, but with the ratio L/D constant at 1.23 while the angle of the diffuser was varied (and thus area ratio was varied). Diffuser half angles DA, and inlet to outlet diffuser area ratio $A_I/A_O$ are both set forth on the horizontal axis. The ratio of the pumping efficiency E of the ejector of the present invention to the pumping efficiency $E_I$ of an ideal ejector (with its diffuser angle varied in the same manner) is plotted on the vertical axis. Note how high the efficiency remained compared to ideal efficiency, even up to half angles as high as about 19°.

Figure 4:
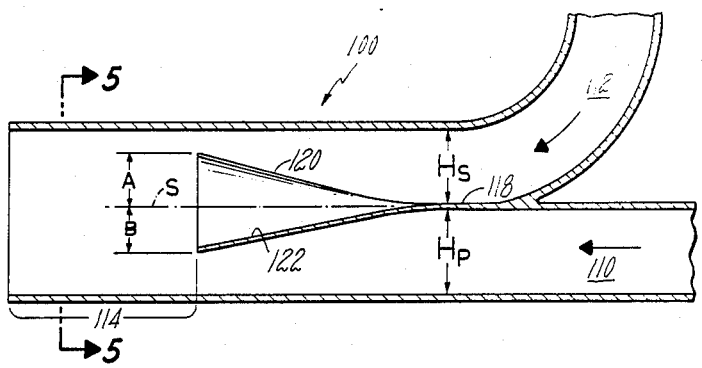
FIG. 4 is a schematic representation of an alternate ejector configuration in accordance with the present invention, without a diffuser.
Figure 5:
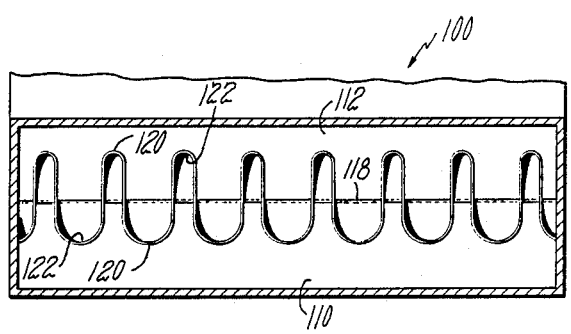
FIG. 5 is a sectional view taken in the direction 5—5 of FIG. 4.

FIGS. 4 and 5 show an ejector similar to the ejector of FIGS. 1–3, except there is only a single low-energy secondary stream. In FIG. 4 the ejector is designated generally by the reference numeral 100. The ejector 100 comprises a high-energy primary fluid flow passage 110, a low-energy secondary fluid flow passage 112, and a mixing region 114. The upstream portions of the primary and secondary ducts 110, 112 are rectangular in cross section and have a common duct wall 118. The downstream portion of the common duct wall 118 is formed into a plurality of downstream extending lobes 120. The lobes 120 alternately project into the secondary passage 112 and the primary passage 110. A lobe which projects into the primary passage creates a corresponding trough 122 in the secondary passage. In this embodiment there is no diffuser downstream of the mixing region 114. The parameter relationships hereinabove discussed also apply to this ejector configuration.

Figure 7:
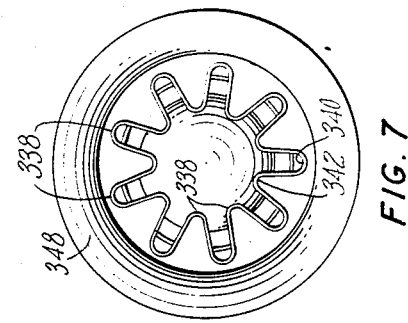
FIG. 7 is a sectional view taken in the direction 7—7 of FIG. 6.
Figure 6:
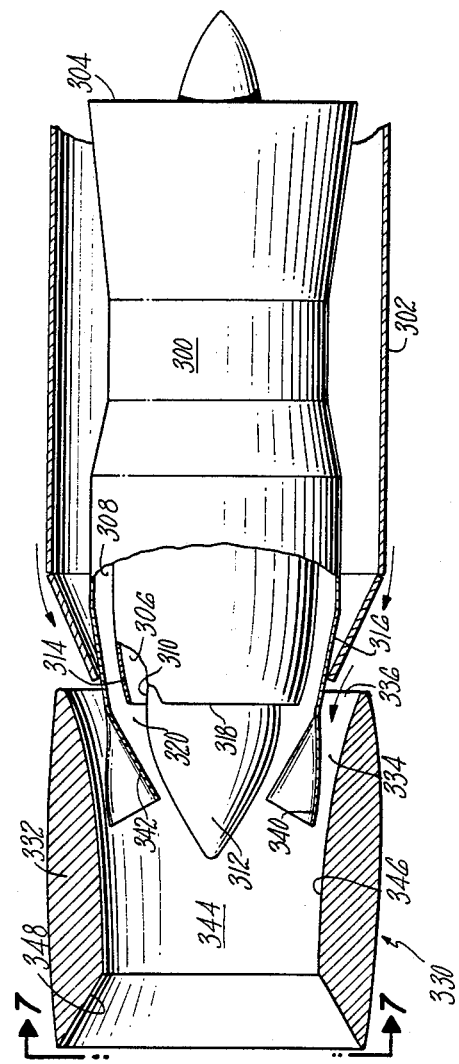
FIG. 6 is a schematic view of a axisymmetric ejector configuration according to the present invention.

FIGS. 6 and 7 show an internal combustion engine which incorporates an ejector of the present invention. In this embodiment the internal combustion engine is a bypass-type gas turbine engine generally represented by the reference numeral 300. The engine 300 is surrounded by a nacelle 302. Air enters the inlet 304 and is divided into a by pass or fan stream and a core engine stream in a manner well known in the art. The core and fan streams remain separate from each other within inner and outer annular passages 306, 308, respectively, the aft ends of which are shown in the drawing. The aft end of the core stream flow path is defined between the outer surface 310 of a center body 312 and the core stream casing 314. The aft end of the annular bypass stream is defined between the core stream casing 314 and an outer engine casing 316. The core and by-pass streams leave their respective annular flow passages at the core engine exit plane 318 and mix together in an annular passage 320 formed between the center body 312 and a downstream extension of the outer engine casing 316. This mixture of bypass and core stream gases is the high energy primary fluid stream for the ejector hereinbelow described.

In this embodiment the engine 300 is equipped with an ejector generally represented by the reference numeral 330. The ejector 330 comprises an annular shroud 332 having an upstream portion spaced from and surrounding the downstream extension of the outer engine casing 316 to define an annular space 334 therebetween. The annular space 334 has an annular inlet 336 which communicates with ambient air external of the nacelle 302. The annular space 334 is the low energy secondary fluid flow passage of the ejector 330, and the annular space 320 between the center body 312 and the casing 316 is the ejector high-energy primary fluid flow passage.

In accordance with the teachings of the present invention, a plurality of circumferentially spaced apart, downstream extending lobes 338 are formed in the downstream portion of the engine casing 316 which is a common wall separating the primary and secondary fluid streams. The lobes 338 extend around the entire periphery of the casing 316 and penetrate alternately into the primary and secondary passages forming a plurality of troughs 340, 342 in, respectively, the primary and secondary fluid flow passages. In operation, energy from the primary high-energy stream is rapidly transferred to the secondary low-energy stream within a mixing region 344 thereby causing ambient fluid to be drawn into the secondary passage 334 adding mass to the exhausted fluids and increasing the thrust produced by the engine. In this embodiment a diffuser 348 is disposed at the downstream end of the mixing region 344. The diffuser lowers the pressure in the mixing region thereby increasing the amount of ambient air drawn into the secondary fluid passage, further augmenting the thrust produced by the engine.

Although the invention has been shown and described with respect to a preferred embodiments thereof, it should be understood by those skilled in the art that other various changes and omissions in the form and detail of the invention may be made without departing from the spirit and scope thereof.

We claim:

1. A fluid dynamic pump comprising wall means defining a bounded primary flow passage having an outlet, a bounded secondary flow passage having an outlet, a bounded mixing region of length L having a substantially constant cross-sectional area and initiating at said flow passage outlets and a diffuser having its inlet at the downstream end of said mixing region for receiving fluid therefrom, said primary flow passage adapted to carry a high-energy primary fluid stream and said secondary flow passage adapted to carry a low-energy secondary fluid stream, said primary and secondary flow passages being separated over at least a portion of their length by a common wall portion comprising a plurality of adjoining lobes, each lobe extending lengthwise in a downstream direction to said primary and secondary flow passage outlets, alternate lobes penetrating, respectively, into said primary passage and said secondary passage to define a wave-like downstream end of said common wall portion, wherein said lobes which penetrate into each of said passages define corresponding troughs in the other of said passages, said lobe contours being selected such that streamwise two-dimensional boundary layer separation from the surfaces of said lobes and troughs does not occur over their entire length, and wherein the ratio of the length L of said mixing region to the effective height D of said diffuser inlet is between 0.5 and 3.0.

2. The pump according to claim 1, wherein the height of each lobe and the depth of each trough gradually increases to a maximum height and depth at the downstream end of said common wall portion.

3. The pump according to claim 2, wherein the lobes penetrate across at least half the height of both the primary and scondary passages at the downstream end of said common wall portion.

4. The pump according to claim 1, wherein the ratio of lobe spacing to lobe amplitude at said primary passage outlet is between 0.25 and 4.0, and L/D is between 1.0 and 2.0.

5. The pump according to claim 4, wherein said primary flow passage is cylindrical immediately upstream of said lobes about an axis, and said secondary flow passage surrounds said cylindrical primary flow passage and is annular and coaxial therewith, and said lobes are circumferentially disposed about said axis.

6. The fluid dynamic pump according to claim 1, wherein said diffuser has a half angle of at least 8 degrees.

7. In an internal combustion engine, an ejector for increasing the thrust produced by the engine comprising:

exhaust duct means having inner and outer surfaces, said inner surface defining the outer surface of a primary flow passage adapted to receive high energy exhaust gases from the engine, said duct means having a downstream end defining an outlet for said high energy exhaust gases; and wall means spaced outwardly from said outer surface defining a bounded secondary flow passage therebetween adapted to carry a low-energy secondary fluid stream, said wall means extending downstream past the plane of said duct means outlet to define a mixing region of length L and substantially constant cross-sectional area for receiving the engine exhaust gases and secondary stream fluid, said mixing region having an inlet at the downstream end of said exhaust duct means, said exhaust duct means comprising a plurality of adjoining lobes, each lobe extending lengthwise in the downstream direction to said exhaust duct means outlet, alternate lobes penetrating, respectively, into said primary passage and secondary passage such that said duct means downstream end has a wave-like shape;

wherein said lobes which penetrate into each of said passages define corresponding troughs in the other of said passages, said lobe size, contours, and length being selected such that streamwise two-dimensional boundary layer separation from the surfaces of said lobes and troughs does not occur over their entire length;

wherein said wall means defines a diffuser initiating at the downstream end of said mixing region for receiving fluid from said mixing region and for diffusing said fluid therethrough; and wherein the ratio of the length L of said mixing region to the effective height D of the diffuser inlet is between 0.5 and 3.0.

8. The ejector according to claim 7, wherein said L/D ratio is between 1.0 and 2.0, said secondary passage substantially completely surrounds said duct means, said lobes are substantially U-shaped in cross section perpendicular to the downstream direction, and said lobes are disposed around substantially the full peripheral extent of said duct means outlet.

9. The ejector according to claim 7, wherein the lobes penetrate across at least half the height of both the primary and secondary passages at said exhaust duct means outlet, and the ratio of lobe spacing to lobe amplitude at said primary passage outlet is between 0.5 and 2.0, and the L/D ratio is between 1.0 and 2.0.

10. The ejector according to claim 7, wherein said diffuser has a half angle of at least 8 degrees.

11. In an improved process for pumping a low-energy secondary fluid stream using apparatus comprising wall means defining a bounded primary flow passage having an outlet, a bounded secondary flow passage having an outlet, a bounded mixing region of length L and substantially constant cross-sectional area initiating at said flow passage outlets, said primary flow passage adapted to carry a high-energy primary fluid stream and said secondary flow passage adapted to carry a low-energy secondary fluid stream, said primary and secondary flow passages being separated over at least a portion of their length by a common wall portion comprising a plurality of adjoining lobes, each lobe extending lengthwise in a downstream direction to said primary and secondary flow passage outlets, alternate lobes penetrating, respectively, into said primary passage and said secondary passage to define a wave-like downstream end of said common wall portion, wherein each lobe which penetrates into one of said passages defines corresponding troughs in the other of said passages, the steps of:

flowing a high-energy fluid through the primary passage;

drawing a low-energy fluid through the secondary passage by ejector action;

mixing said primary and secondary fluids in the mixing region immediately downstream of the common wall portion to create said ejector action; and diffusing said mixed fluid in a diffuser having an effective height D and having its inlet at the downstream end of the mixing region, wherein L/D is between 0.5 and 3.0;

wherein the steps of flowing and drawing said fluids is done without the occurrence of streamwise two-dimensional boundary layer separation from the surfaces of the lobes and troughs of the common wall portion;

wherein the lobes and troughs generate large-scale axial vortices in the mixing region; and wherein the step of diffusing enables the ejector to pump more efficiently.

12. The process according to claim 11, wherein the step of diffusing is accomplished in a diffuser having a half angle of at least 8 degrees.

* * * * *